RECOVERY SYSTEM FOR A DIGITAL MAGNETIC RECORDING

Filed March 19, 1968 2 Sheets-Sheet 1

INVENTORS
DAVID G. ADLER
ROLAND C. HOLLINGSHEAD

United States Patent Office 3,562,724
Patented Feb. 9, 1971

3,562,724

RECOVERY SYSTEM FOR A DIGITAL MAGNETIC RECORDING

David G. Adler, Drexel Hill, and Roland C. Hollingshead, Philadelphia, Pa., assignors to Sperry Rand Corporation, New York, N.Y., a corporation of Delaware Filed Mar. 19, 1968, Ser. No. 714,312
Int. Cl. G11b *5/02, 5/44*
U.S. Cl. 340—174.1 6 Claims

ABSTRACT OF THE DISCLOSURE

A signal recovery circuit for a digital magnetic recording system is disclosed in which the recovered signal is fed through a series of rectifying stages each intercoupled to the next via an A.C. coupling network.

This invention relates to a signal recovery circuit for a digital magnetic recording system and in more particular, to a novel circuit arrangement for eliminating the effects of fortuitous base line signal variations.

In various types of digital magnetic recording and recovering schemes, the read signal peaks are detected and utilized to reconstruct the original recorded signal. In such systems the read signals are differentiated and then fed to a zero cross-over detection circuit where the read signal peaks are detected as zero cross overs. In read-recovery systems such as this, signal distortions and/or signal flats which occur near the base line of the read signal will frequently operate the zero cross-over detector and thus produce erroneous data pulses or timing errors in the recovered signal. Elaborate AGC systems have been utilized in the past to overcome these problems, but such systems in general are not fast enough to reliably remove the effects of base line distortion signals.

BRIEF SUMMARY

The present invention avoids the aforementioned problems by a novel base line clipping network interposed between the read-recovery amplifier and the differentiating circuit of the recovery system. In more particular, the base line clipping network comprises a cascaded series of stages of half wave rectifying means in which each stage is coupled to the next via an A.C. coupling network. Each of the rectifying stages and its associated A.C. coupling network establishes a new base line clipping value for the next rectifying stage in the chain. By this means a wide amplitude range of signal distortions occurring near the base line of the read signal can be removed and the effects of these signal distortions on the recovery circuit eliminated.

Figure 1:
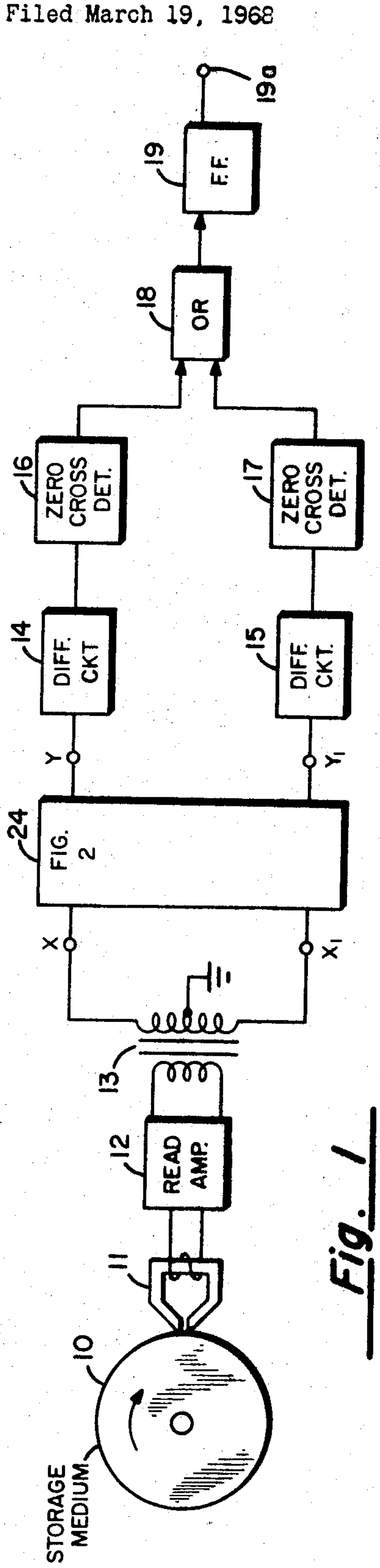
Figure 2:
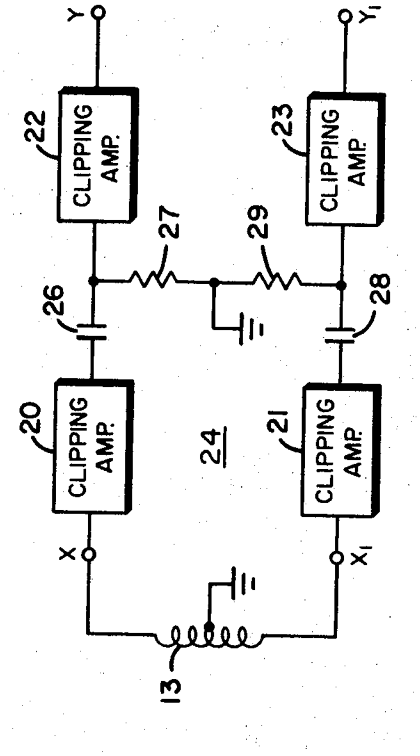
Figure 3:
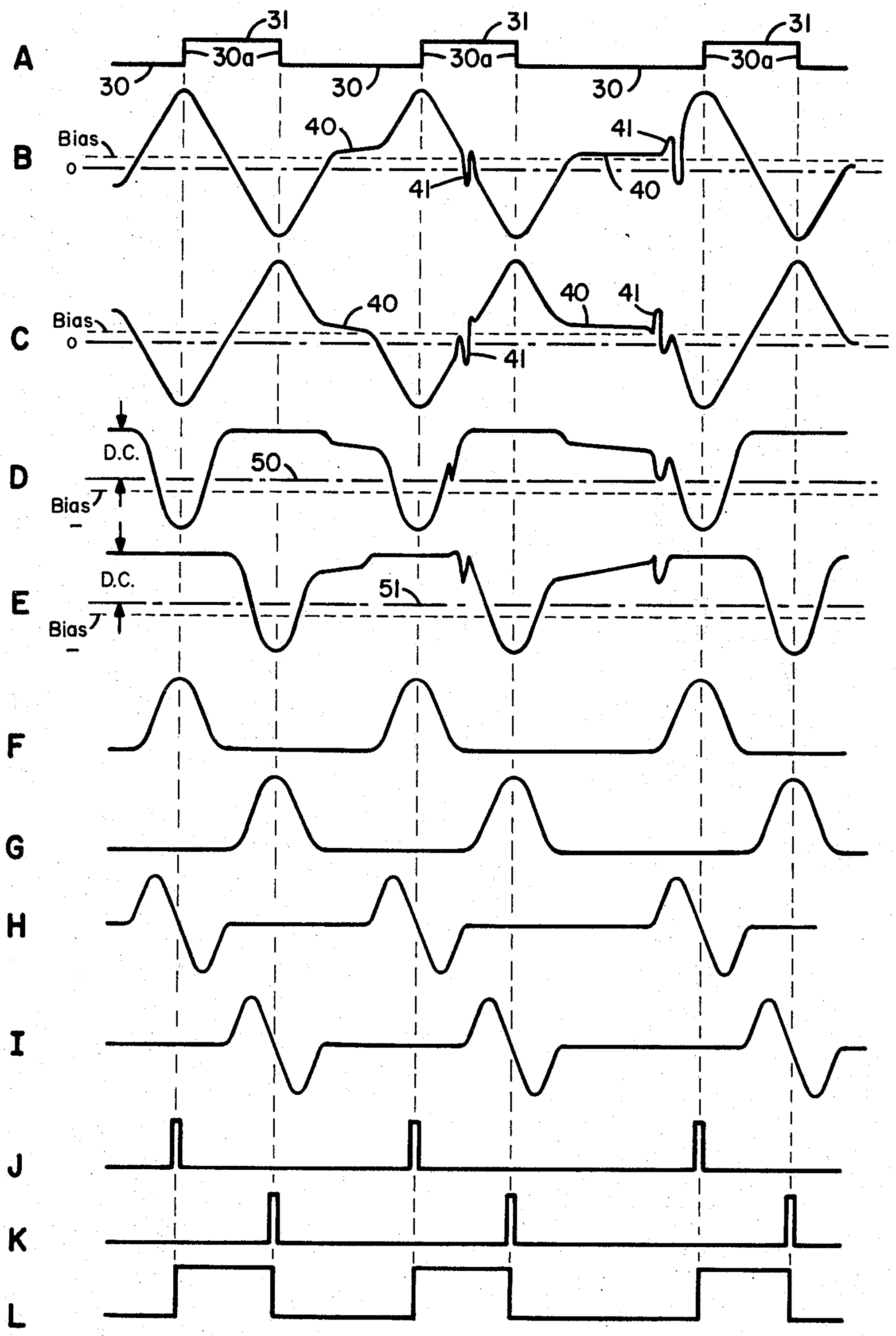

In the drawings to which reference is now made, FIG. 1 shows in block diagram form one embodiment of the present invention;

FIG. 2 shows in block diagram form one novel circuit useable for insertion between the X and Y and X1 and Y1 terminals of FIG. 1; and FIG. 3 shows a series of waveforms useful in explaining the operation of the present invention.

In FIG.1, 10 represents a magnetic recording medium such as a magnetic drum or disk on which a digital signal such as shown by waveform A in FIG. 3 has been recorded and which it is desired to recover. In practice the digital signal may be recorded by utilizing, for example, the non-return to zero (NRZ) type of recording. In such a system the magnetic recording medium 10 is saturated in a first direction represented at 30 in waveform A and then driven to saturation in the opposite direction as represented at 31 in waveform A. In this recording mode, the signal translations from 30 and 31 which are represented by the lines 30*a* in waveform A may be taken to represent the binary digit value "1." The lines 30*a* thus represent the points of maximum flux change in the recorded signal.

In FIG. 1, the reference number 11 represents a magnetic transducer which may contact recording medium 10 or be in close proximity thereto. The reference number 12 represents an amplifier which is normally used to amplify the output of the transducer 11. 13 is a push-pull transformer which is coupled to the output of the read amplifier 12. Reference number 24 represents a cascaded clipping circuit constructed according to the teachings of the present invention for interconnecting the terminals X and Y and X1 and Y1. The circuit 24 is shown in more detail in FIG. 2.

The outputs from the circuit of FIG. 2 are fed to a pair of respective differentiating circuits 14 and 15 which may be typically RC networks. The outputs from the differentiating circuits 14 and 15 are in turn fed to a pair of zero-cross detectors 16 and 17 which may be Schmitt trigger circuits designed to produce an output pulse each time the output from the corresponding differentiating circuits 14 and 15 crosses the zero point in one direction. 18 is a logical "OR" gate or buffer network which combines the outputs from the zero-cross detectors 16 and 17 and feeds them to the toggle input of a flip-flop 19. The output 19*a* from the toggle flip-flop develops the recovered signal.

In operation there will appear at the output terminals X and X1 of the push-pull transformer 13 a pair of output signals such as shown in waveforms B and C of FIG. 3 when the digital signal of waveform A is being recovered. As shown by waveforms B and C noise voltages such as indicated at 41 or signal flats such as indicated at 40 will sometimes occur in the recovery of the signal shown by waveform A. It is these noise voltages 41 and signal flats 40 which it is desired to remove.

The push-pull outputs from transformer 13 (waveform B and C) are fed to a pair of clipping amplifiers 20 and 21 as shown in FIG. 2. The clipping amplifiers 20 and 21 which may be rectifying stages or in a preferred embodiment class C type amplifiers are biased so as to pass only those portions of the respective waveforms which lie above the bias lines shown in curve waveforms B and C. The resulting half wave outputs from clipping amplifiers 20 and 21 are shown by wavforms D and E, respectively. As shown in these waveforms the outputs are unipolar pulses in which the signals below the bias lines shown by waveforms B and C have been eliminated. Also as shown in waveforms D and E the clipping amplifiers 20 and 21 establish D.C. level which is indicated at 50 and 51 about which the outputs from the clipping amplifiers 20 and 21 vary in an alternating current fashion. By passing the signals represented by waveforms D and E through an A.C. coupling network such as shown at 26, 27, 28 and 29 in FIG. 2, the D.C. level of waveforms D and E can be removed to provide a new zero or base line voltage corresponding to lines 50 and 51. The capacitors 26 and 28 operate to remove the D.C. component from the waveforms D and E so that the reference lins 50 and 51 now correspond to ground or the zero voltage point at the input to the clipping amplifiers 22 and 23. The signals developed at the output of the A.C. coupling networks are then fed to the additional clipping stages 22 and 23 as shown in FIG. 2. These amplifiers are biased as indicated in waveform D and E so as to pass only those signals that are more negative than the bias line. The outputs from clipping amplifiers 22 and 23 are then as shown by waveforms F and G, respectively. It will be noted that the waveforms F and G are now free of the noise pulses 41 and the signal flats 40 since these signals which appeared in waveforms D and E all were above the bias line indicated in these waveforms.

In a typical application the first clipping amplifiers 20 and 21 can be a biased NPN type of transistor circuit while the clipping amplifiers 22 and 23 can be biased PNP type transistor circuits. In the alternative, biased rectifiers can be used for the circuits 20, 21, 22 and 23 except an amplifier type of rectification stage is preferred in order to maintain a high level signal at the output terminals Y and Y1 of FIG. 2.

The pulse outputs from FIG. 2 appearing at terminals Y and Y1 (waveforms F and G respectively) are applied to the respective differentiator circuits 14 and 15 to produce the waveforms H and I of FIG. 3. As indicated by these waveforms, a zero cross point will occur at the center of each of the pulse peaks developed in waveforms F and G. These cross-overs are detected by the cross-over detectors 16 and 17 to produce the pulse outputs as shown by waveforms J and K. The pulse outputs from the detectors 16 and 17 shown by waveforms J and K are then used to toggle the flip-flop 19 to produce the waveform pattern shown by waveform L at the output terminal 19*a*. As indicated by waveform L the original recorded signal shown by waveform A has been recovered.

In a typical application a two-stage clipping amplifier arrangement has been found to be suitable. However, in cases of severe noise levels it may be desired to extend the clipping network to include three or more stages of rectification. In this case, each such stage is intercoupled to the next through an A.C. coupling network (either an R.C. network or a transformer) as shown in FIG. 2 whereby a new base line and a new reference level for the clipping operation may be developed.

Although only a certain and specific embodiment of the invention has been shown it will be understood that modifications may be made therein without departing from the spirit of the invention.

What is claimed is:

1. In a signal recovery circuit for a digital magnetic reproducing system which includes a transducer means, and a utilization device; a signal coupling network for coupling the signal output of said transducer means to said utilization device and for eliminating signal distortions occurring near the base line of the signal output from said transducer means, said signal coupling network comprising first and second biased half wave rectifying stages and an A.C. coupling means interconnecting said first and second rectifying stages in cascade, said A.C. coupling means having the property of providing an undistorted signal coupling from the first rectifying stage to the second rectifying stage and of providing a new base line for the signal applied to the second rectifying stage.

2. The structure of claim 1 wherein at least one of said rectifying stages comprises a biased amplifier.

3. The structure of claim 1 wherein each of said rectifying stages comprises a biased amplifier.

4. The structure of claim 1 wherein the utilization device includes a signal differentiating network and a zero cross detector interconnected in the order named to the output of said second rectifying stage.

5. In a signal recovery circuit for a digital magnetic reproducing system which includes a transducer means and a utilization device; a push-pull signal coupling network for coupling the signal output of said transducer means to said utilization device and for eliminating signal distortions occurring near the base line of the signal output from said transducer means, each side of said push-pull signal coupling network comprising first and second biased half wave rectifying stages and an A.C. coupling means interconnecting said first and second rectifying stages in cascade, each of said A.C. coupling means having the property of providing an undistorted signal coupling from the first rectifying stage to the second rectifying stage and of providing a new base line for the signal applied to the second rectifying stage.

6. The structure of claim 5 wherein each of said rectifying stages comprises a biased amplifier.

References Cited

UNITED STATES PATENTS

| | | | |
|---|---|---|---|
| 2,864,077 | 12/1958 | Turk | 340—174.1 |
| 3,164,815 | 1/1965 | Applequist | 340—174.1 |
| 3,209,268 | 9/1965 | Fraunfelder | 340—174.1 |
| 3,271,750 | 9/1966 | Padalino | 340—174.1 |
| 3,404,391 | 10/1968 | Chur | 340—174.1 |

BERNARD KONICK, Primary Examiner

V. P. CANNEY, Assistant Examiner